(12) United States Patent
Hayden et al.

(10) Patent No.: US 8,874,971 B1
(45) Date of Patent: Oct. 28, 2014

(54) DETECTING AND REPORTING PROBLEMS IN A DISTRIBUTED RESOURCE COMPUTING SYSTEM

(75) Inventors: Andrew Hayden, Seattle, WA (US); Adam Days, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 867 days.

(21) Appl. No.: 12/982,225

(22) Filed: Dec. 30, 2010

(51) Int. Cl.
*G06F 11/00* (2006.01)

(52) U.S. Cl.
USPC .......................................... 714/38.14; 714/57

(58) Field of Classification Search
USPC .................................................. 714/38.14, 57
See application file for complete search history.

(56) References Cited

U.S. PATENT DOCUMENTS

| | | | |
|---|---|---|---|
| 6,629,267 B1 * | 9/2003 | Glerum et al. .............. | 714/38.11 |
| 8,010,845 B2 * | 8/2011 | Rui et al. ...................... | 714/38.1 |
| 8,060,869 B1 * | 11/2011 | Panchenko et al. ........... | 717/158 |
| 8,185,651 B2 * | 5/2012 | Moran et al. ................... | 709/235 |
| 2005/0081108 A1 * | 4/2005 | Shabalin .......................... | 714/38 |
| 2007/0115860 A1 * | 5/2007 | Samele et al. ................. | 370/259 |
| 2008/0263406 A1 * | 10/2008 | Prescott et al. ................. | 714/38 |

* cited by examiner

*Primary Examiner* — Bryce Bonzo
*Assistant Examiner* — Elmira Mehrmanesh
(74) *Attorney, Agent, or Firm* — Thomas Horstemeyer, LLP

(57) ABSTRACT

Methods, systems and computer program products are provided. Methods for identifying problems in a distributed computing system may include receiving a user-selected identifier that corresponds to a nonfunctionality in an application. Problem requests including content corresponding to the user-selected identifier are sent to services that provide functionality to the application. The services may optionally respond to the problem requests with problem response data. The problem response data is stored in a data storage allocation that is associated with the user-selected identifier. The problem response data may be retrieved from the data storage allocation.

33 Claims, 8 Drawing Sheets

DETECTING AND REPORTING PROBLEMS IN A DISTRIBUTED RESOURCE COMPUTING SYSTEM

BACKGROUND

A distributed resource computing system may provide shared resources, such as processor(s), software, and information, to computers and other devices on demand. Customers of the distributed resource may include internal and/or external customers who may develop, create and/or test applications in the development space and/or the content space provided by the system. The execution of such applications may require the access and functionality of many different computing resources that may be wholly distinct from one another. For example, a web-based browser application may be supported by many different services to load, execute and display content properly. In some cases, the functions and/or presence of such services may be transparent to the customer.

When a customer experiences a problem with an application, such problem may be difficult to identify and/or resolve absent knowledge regarding the numerous different services that are involved in the application. Additionally tracing such problems may be difficult because the conditions under which a problem occurs may be very specific, for example, time of day, IP address, browsing history, purchase history, cart status, etc. Such data may not be captured in a uniform resource locator (URL) and thus may be difficult to recreate. Additionally, formal debugging systems may require technical knowledge to access request identifications corresponding to the services, which may be time consuming and/or cumbersome to implement. Yet further, formal debugging systems may require the various services to plug into highly customized frameworks.

DETAILED DESCRIPTION

Figure 1:
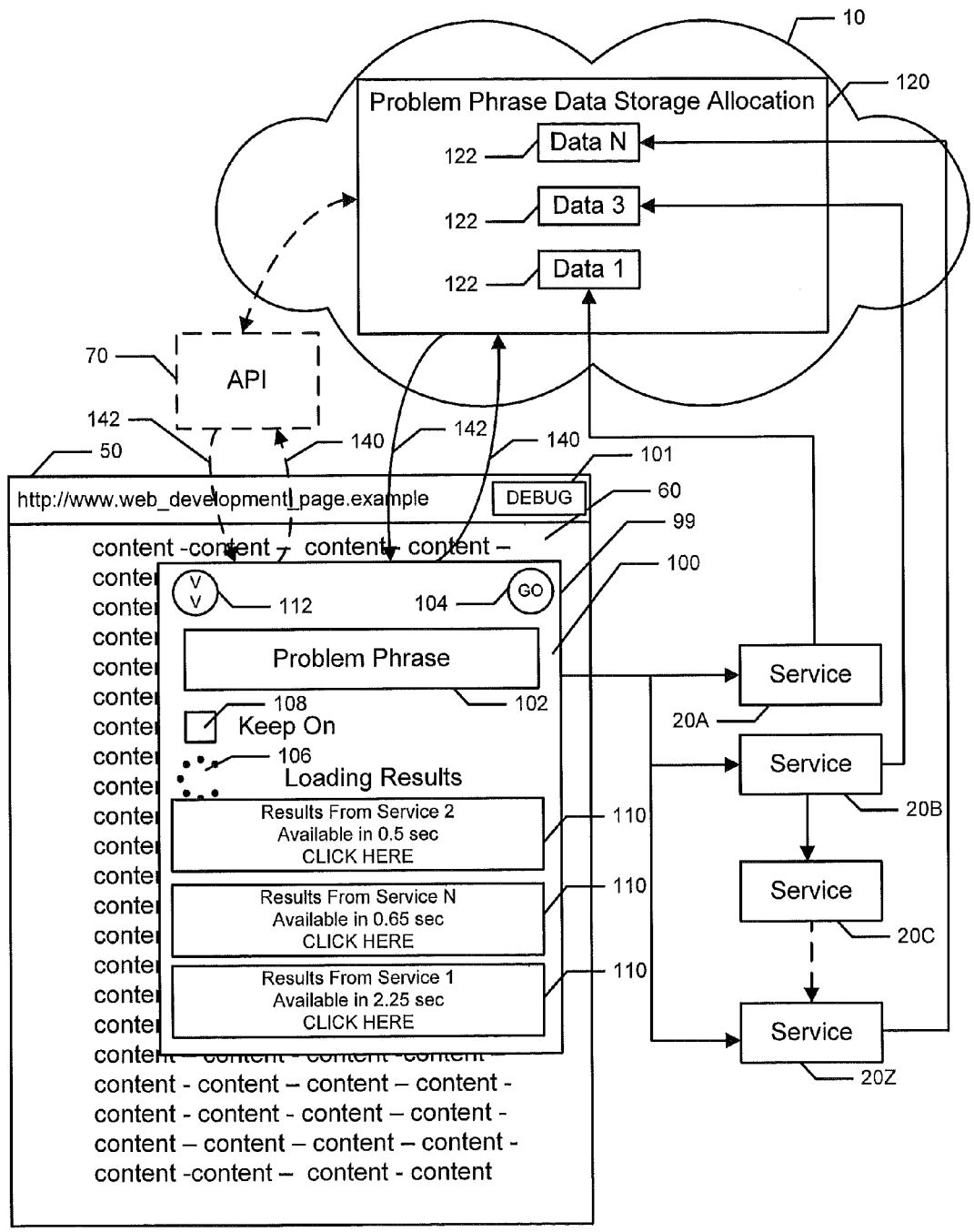
FIG. 1 is a block diagram of systems, devices, methods and computer program products for identifying functionality problems of an application in a distributed computing environment, according to various embodiments described herein.

Various embodiments described herein recognize that customers in a distributed computing environment may include internal customers such as application and/or content developers who may create and test applications, programs, and/or systems that may serve content providers and/or provide content to other internal customers, commercial customers and/or external customers. Some embodiments provide that the customers (e.g., internal customers, among others) as described herein may be referred to as users. Non-limiting examples may include computer applications including those designated for implementation in a web-based environment, such as those that may be executed using an Internet browser. Such applications may access many different services that each may perform one or more specific functions that are necessary for the application to function completely and/or correctly. In the case of an application that is not functioning properly or completely, systems, devices, methods and computer program products for identifying functionality problems of the application may include a debug plug-in application (plug-in). In some embodiments, the plug-in may be configured for use in selected browsers, but the disclosure is not so limited. The plug-in may enable a "Debug" software button to be available on every page the internal customer is viewing. As used herein, a plug-in may include a piece of software that enhances another software application.

The "Debug" button is operative to open a user interface that corresponds to an introspection application that includes a field for the user to enter a problem phrase. In some embodiments, the problem phrase may be a user-selected descriptive identifier (e.g., describes the problem, is easy to remember, etc.) In this regard, marking a problem request with a tracking token may be simple and intuitive for the user. Once the problem phrase is entered, the user may click on a "GO" button of the user interface that executes a debug operation that uses the problem phrase as an identifier. When the "GO" button is clicked, an identifier associated with the application may be resubmitted along with additional information that includes the problem phrase. For example, if the user is experiencing problems with a webpage, the identifier may include the associated uniform resource locator (URL).

Additionally, a query parameter such as a common gateway interface (CGI) query parameter that includes the problem phrase may also be submitted with the identifier. The identifier and the problem phrase query parameter may serve as a problem request that is sent to the multiple services that are used in providing the application, such as a webpage, among others. By resubmitting the problem phrase with the identifier, the problem phrase may serve as an alternate key for tracing interactions throughout the system.

The services that receive the problem request may optionally provide data that is responsive to the problem request. For example, some services may not provide any data while other services may provide problem response data. Additionally, services that do respond, may respond with varying levels of response. For example, each service may decide what to publish in response to the problem request.

The data provided by the services is stored in a data storage allocation of a data storage service. The data storage allocation is identified by the problem phrase or some variant thereof. For example, some embodiments provide that the identifier of the data storage allocation is a consistent obfuscation and/or hashing of the problem phrase. In some embodiments, the data storage allocation is generated by a request from the introspection application. Some embodiments provide that the data storage allocation is generated by a request from one of the services that is providing problem response data. As such, ones of the services may send data corresponding to the problem phrase to the data storage allocation that corresponds to the problem phrase. In this manner, the services may be decoupled from one another in responding to the problem request.

After the introspection application is executed and the problem requests are sent to the services, the user interface may display a status indicator and/or icon that communicates that results are loading or a similar message. The introspection application may begin polling the data storage allocation for results from the services. For example, polling may occur at regular intervals that may be fractions of a second or multiple seconds. When results are present in the data storage allocation, the introspection application may retrieve such results and display them to the user in the user interface. Such results may include identification of the responding service, metadata included in the problem response data and/or an elapsed time from the time the problem request was sent, among others. The metadata may include one or more links to other documents and/or applications that may be responsive to the problem request.

Overall Architecture

Reference is now made to FIG. 1, which is a block diagram of systems, devices, methods and computer program products for identifying functionality problems of an application in a distributed computing environment, according to various embodiments described herein. Although examples discussed herein include webpage applications in a browser, the disclosure is not so limited. For example, systems, devices, methods and computer program products described herein may be implemented corresponding to many other computer applications and/or systems.

The application of the current example includes a webpage 50 that is configured to display content 60 to a user. If the content and/or functionality of the webpage 50 is incorrect and/or incomplete, the user may select a debug button 101. The debug button 101 is configured to execute a introspection application 99 that displays a user interface 100 corresponding to the introspection application 99. In some embodiments, the user interface 100 is displayed over the content 60 of the displayed webpage 50 and/or a portion thereof. Some embodiments provide that the user interface 100 opens a new window (not shown) in the operating system and is displayed therein.

The user interface 100 includes problem phrase field 102 that is configured to receive a user-selected identifier as a problem phrase. Some embodiments provide that a "GO" button 104, or other similar user interface operation initiating input feature may be provided. In response to selecting or clicking the "GO" button 104, the introspection application 99 may send problem request data to the services 20 that are used in providing the webpage 50. Some embodiments provide that the problem request data may be sent directly and/or indirectly to the services 20 from the introspection application 99. For example, as illustrated, service 20B may send the problem request data to service 20C, which may not have received problem request data from the introspection application 99. Although not illustrated, other services may receive problem request data from, for example, service 20C and so on. In this manner, any of the services 20 that provide the webpage 50, whether directly or indirectly, may receive problem request data. Additionally, a service 20, which may referred to as a parent service, that may access multiple other services, which may be referred to as child services, may selectively determine which of the child services to send problem request data to. In some embodiments, a dynamic indicator or icon 106 may be displayed along with a message such as, for example, "Loading results" or the like. Additionally, the user interface 100 may include other display control features including a minimize button 112, among others.

A data storage service 10 may provide data storage that is web-based and/or online and may include local and/or off-site storage. The data storage service 10 may be configured to generate a data storage allocation at the request of a data storage customer. As used herein, the data storage service 10 may generate a data storage allocation 120 that corresponds to the problem phrase. The data storage allocation 120 may be generated responsive to a communication from the introspection application 99 and/or one of the services 20. Ones of the services 20 that choose to respond to the problem request may send problem response data 122 to the data storage allocation 120. For example, services 20A, 20B and 20Z provided problem response data to the data storage allocation 120, whereas service 20C did not.

Once the problem requests are sent to the services 20, the introspection application 99 may begin polling (arrow 142) the data storage allocation 120 for problem response data 122 to be retrieved (arrow 144) from the services 20. The introspection application 99 may continue to poll (arrow 142) the data storage allocation 120 and retrieve (arrow 144) the problem response data 122 as it becomes available. In this regard, the user interface 100 may include a results display 110 that includes information corresponding to the problem response data 122. For example, some embodiments provide that service identifying information, links provided by the services, and/or the elapsed time from the problem request may be displayed to the user. Some embodiments provide that an application programming interface (API) 70 may be provided between the introspection application 99 and the data storage allocation 120 to provide a single point interface for the introspection application 99 and further isolation therebetween.

Some embodiments provide that the user interface 100 includes "Keep On" input 108 that is configured to keep the introspection application 99 active until the keep on input 108 is unselected. In this manner, the introspection application 99 may remain active as the user navigates to subsequent pages and any problem response data 122 provided by the services 20 will continue to accumulate in the data storage allocation 120 that corresponds to the problem phrase. Additionally, some embodiments provide that subsequent sessions on the same and/or different web pages may accumulate data in the same data storage allocation as long as the same problem phrase is used when the introspection application 99 is activated.

Although illustrated and described above in the context of services 20 used in providing a webpage, the embodiments described herein are not so limited. For example, some embodiments provide that the introspection application 99 may be a plug-in that is provided in a software development environment for identifying problems in software programs, systems, applications, routines, blocks, objects, subroutines and/or portions thereof that are being developed to provide a software operation. In such embodiments, the introspection application 99 may send problem response data to ones of the portions of code that are used to provide the software operation. In response, the portions of code may selectively determine whether, what and how to respond to the problem request data. In this regard, problem response data may include metadata that identifies source code including, but not limited to file name and/or line number(s) therein. In this manner, the problem response data provided independently corresponding to the different portions of code may be accumulated in a central repository and accessed through the introspection application 99.

Figure 2:
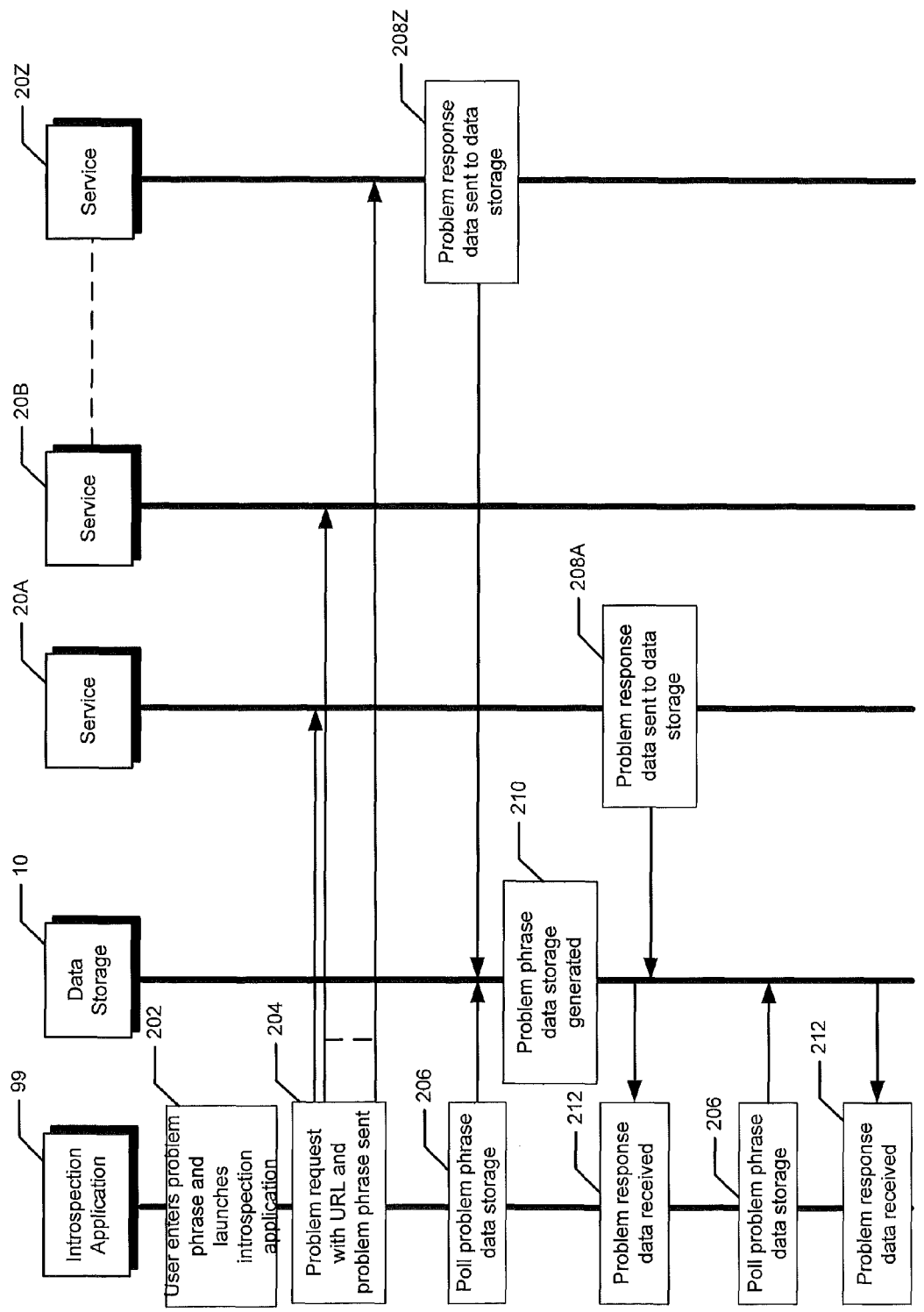
FIG. 2 is a diagram of operations and associated message flows that may be performed to identify functionality problems of an application in a distributed computing environment according to some embodiments described herein.

Reference is now made to FIG. 2, which is a diagram of operations and associated message flows that may be performed by various elements disclosed herein to identify functionality problems of an application in a distributed computing environment according to some embodiments described herein. Using the user interface of the introspection application 99, a user enters a problem phrase and launches the introspection application (block 202). A problem request including the URL of the currently operating page and the problem phrase is sent to the all of the services 20 (block 204).

The introspection application 99 may poll the data storage service 10 for problem response data (block 206). In the present example, service 20Z sends problem response data to the data storage service 10 (block 208Z). In response to receiving either of the polling from the introspection application 99 or the problem response data from service 20Z, the data storage service generates a problem phrase data storage allocation (block 210).

In response to the polling, the problem response data is received by the introspection application 99 (block 212). In some embodiments, the data storage allocation may be configured to end problem response data at regular intervals without polling. Additional problem response data may be subsequently provided by service 20A and sent to the data storage allocation (block 208A). The introspection application 99 may continue to poll the data storage allocation (block 206) and may receive new problem response data (block 212). The type of problem response data that is provided by different ones of the services may vary according to what the service decides to publish.

Use Case Example—Link to Document

Figure 3:
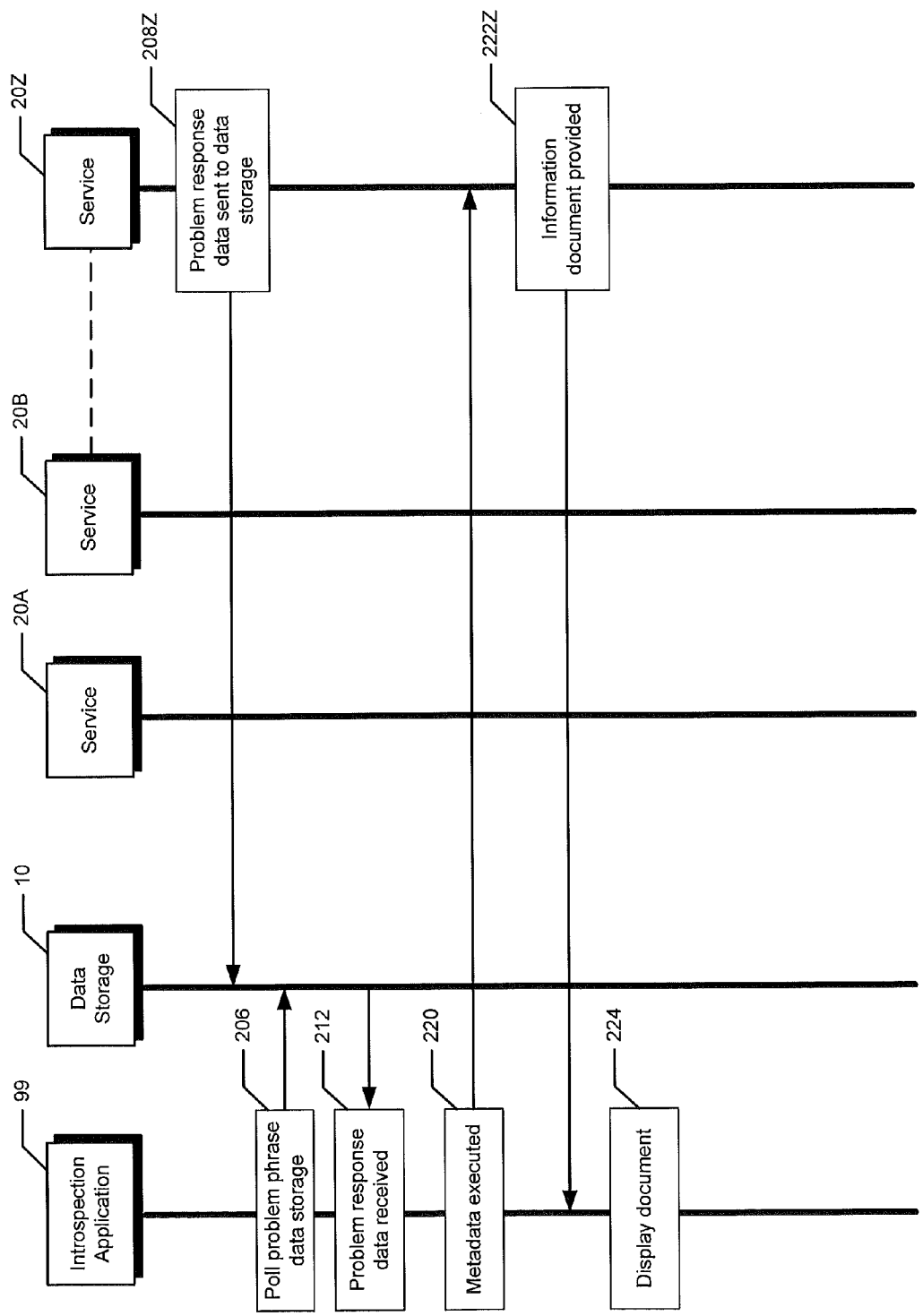
FIG. 3 is a diagram of operations and associated message flows that may be performed to identify functionality problems of an application in a distributed computing environment in which a service provides problem response data that includes an information document according to some embodiments described herein.

Reference is now made to FIG. 3, which is a diagram of operations and associated message flows that may be performed by various elements disclosed herein to identify functionality problems of an application in a distributed computing environment in which a service provides problem response data that includes an information document according to some embodiments described herein. The operations described herein begin after the problem request has been sent and the data storage allocation (120 in FIG. 1) has been generated, as described above regarding FIG. 2. Also as previously described, service 20Z sends problem response data to the data storage allocation (block 208Z), the introspection application polls the data storage allocation (block 206) and receives problem response data (block 212). The problem response data includes metadata that may be executed by the user through the user interface of the introspection application (block 220). For example, the metadata may include a link, such as a hyperlink, that includes a URL to an information document that is provided by the service 20Z (block 222Z). The information document may be displayed using the user interface (block 224), A first non-limiting example of metadata and information therein that may be provided in the information document may include metadata describing an exception in a service. The following example illustrates how a given service "MyService" might send back information that would normally have to be manually located in log files after the fact. In this example, the service has captured an exception, which it directly exposes via metadata. This kind of metadata may be useful for realtime debugging by a developer of MyService. The example may have XML structure, which may be simple to parse and access programmatically.

<metadata source="MyService">
      <host>myhost.host.com<host>
      <timestamp>2010-12-10 04:22:52.255 UTC</timestamp>
      <requestId>987545-58942-89475395</requestId>
      <problemPhrase><![CDATA[Debugging MyService, 2010-12-10]]></problemPhrase>
      <operation>amazingOperation<operation>
      <args>
        <arg>thisBadArgumentWillCauseNPE</arg>
      </args>
      <exception class="java.lang.NullPointerException">
        <trace>
<![CDATA[
Exception in thread "main" java.lang.NullPointerException at MyService.doAmazingThings(MyService.java:8) at MyService.main(MyServicejava:4)
]]>
        </trace>
      </exception>
    </metadata>

In another non-limiting example, metadata may provide an informational dump describing how service "MyService" dealt with a given request. This example illustrates simple textual output that might be suitable for troubleshooting performance problems and may be geared toward a human reader. The format may include simple text.

Performance analysis of request 987545-58942-89475395:
  Time spent analyzing arguments: 3 ms
  Candidate results found: 5345
  Results filtered: 5341
  Results eligible: 4
  Ranking:
    Object AFJD-SJFURN-SJDJKD: Rank 1, confidence 4.534
    Object KFDF-ASIREM-SELELS: Rank 2, confidence 2.456
    Object ASKL-QFCIER-SKWXXA: Rank 3, confidence 2.221
    Object LWWW-LKASES-DONKEY: Rank 4, confidence 0.122
  Time spent ranking: 32 ms
  Marshalled objects: 1102
  Hash lookups: 8343
  Response size: 48,332 bytes (0.04 megabytes)
  Total time: 67 ms (0.067 sec)

In another non-limiting example, metadata may provide a binary dump of some interesting data produced by service "MyService" for a given request. The metadata takes the form of a simple (key,value) pair file (such as a Java "properties" file) that defines the location of the binary dump file as well as a URL for a tool (support by the MyService owners) that can appropriately process and display the binary dump contents.

```
requestId=987545-58942-89475395
timestamp=2010-12-10 04:22:52.255 UTC
errorsEncountered=1
successful=false
binaryDump=https://myservice.cloud-debug.service-
    .com/dumps/987545-58942-89475395.dump.gz
checksumMd5=893497d9872cb9897a9d9e977d99df9f
compression=gzip
lengthBytes=397523
viewer=https://www.example.com/debugger/debug?re-
    quesfid=987545-58942-89475395
```

Use Case Example—Link to Diagnostic Application Using Binary Data

Figure 4:
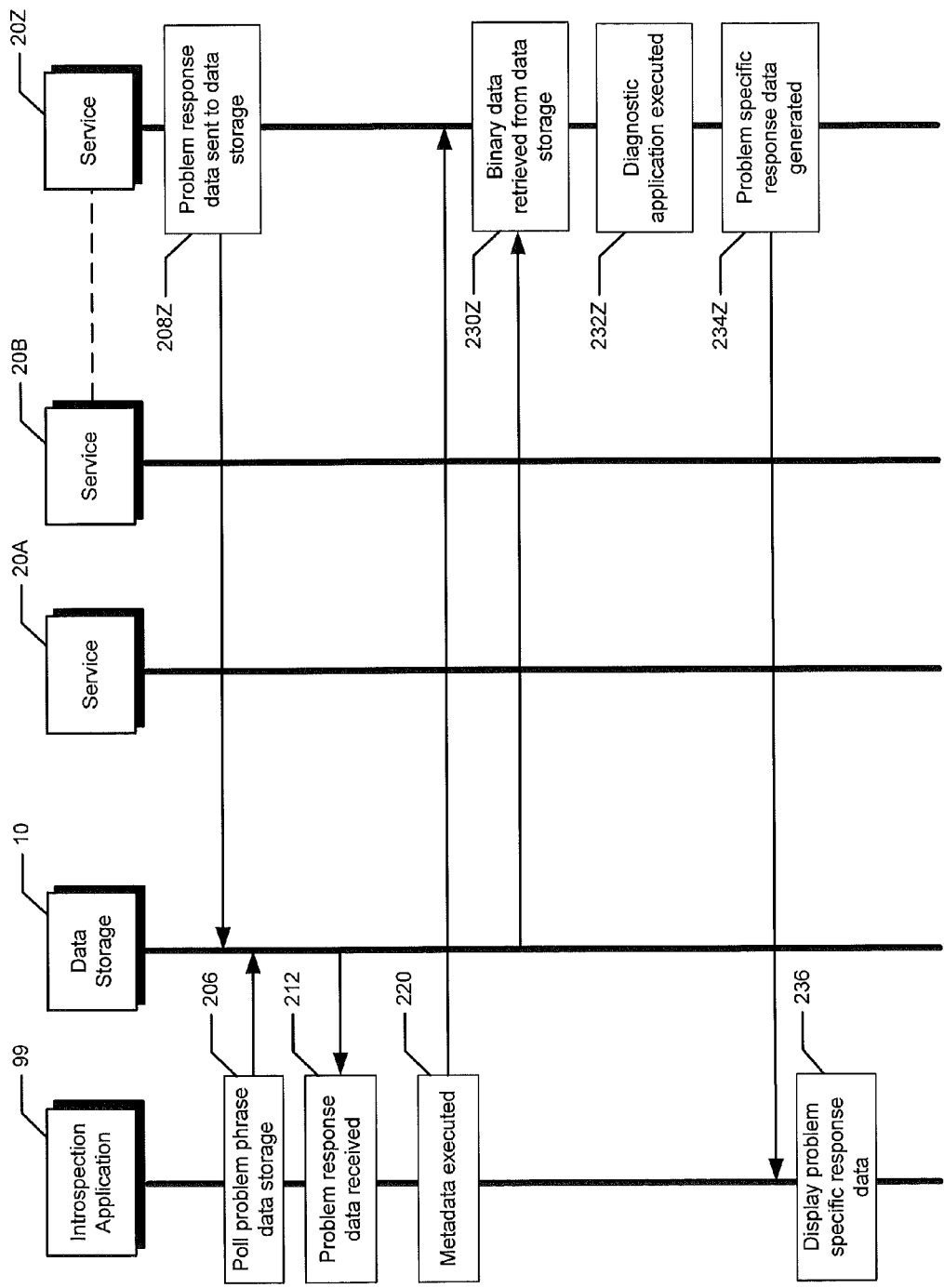
FIG. 4 is a diagram of operations and associated message flows that may be performed to identify functionality problems of an application in a distributed computing environment in which a service provides problem response data that includes binary data that may be executed using a diagnostic application according to some embodiments described herein.

Some embodiments provide that the metadata included in the problem response data may include information that is more specific to the problem request than a document. For example, reference is now made to FIG. 4, which is a diagram of operations and associated message flows that may be performed by various elements disclosed herein to identify functionality problems of an application in a distributed computing environment in which a service provides problem response data that includes binary data that may be executed using a diagnostic application according to some embodiments described herein. The operations described herein begin after the problem request has been sent and the problem phrase data storage allocation has been generated, as described above regarding FIG. 2. Also as previously described, service 20Z sends problem response data to the data storage allocation (block 208Z), the introspection application polls the data storage allocation (block 206) and receives problem response data (block 212) and the metadata is executed (block 220).

The metadata may include a link, such as a hyperlink, that includes a URL to a diagnostic application provided by the service 20Z (block 232Z). In some embodiments, the diagnostic application may retrieve binary data that was part of the problem response data provided by the service 20Z and that was stored in the data storage allocation (block 230Z). In this manner, problem response data that was specific to the problem request at the time of the problem request may be preserved for future analysis. Once the diagnostic application is executed, problem specific response data may be generated (block 234Z). Some embodiments provide that the problem specific response data may include a variety of different information types and may be provided in a variety of formats, including, tabular, text, graphical, raw data, statistical data, and/or heuristic data among others.

Use Case Example—Generate Shared Permission

Figure 5:
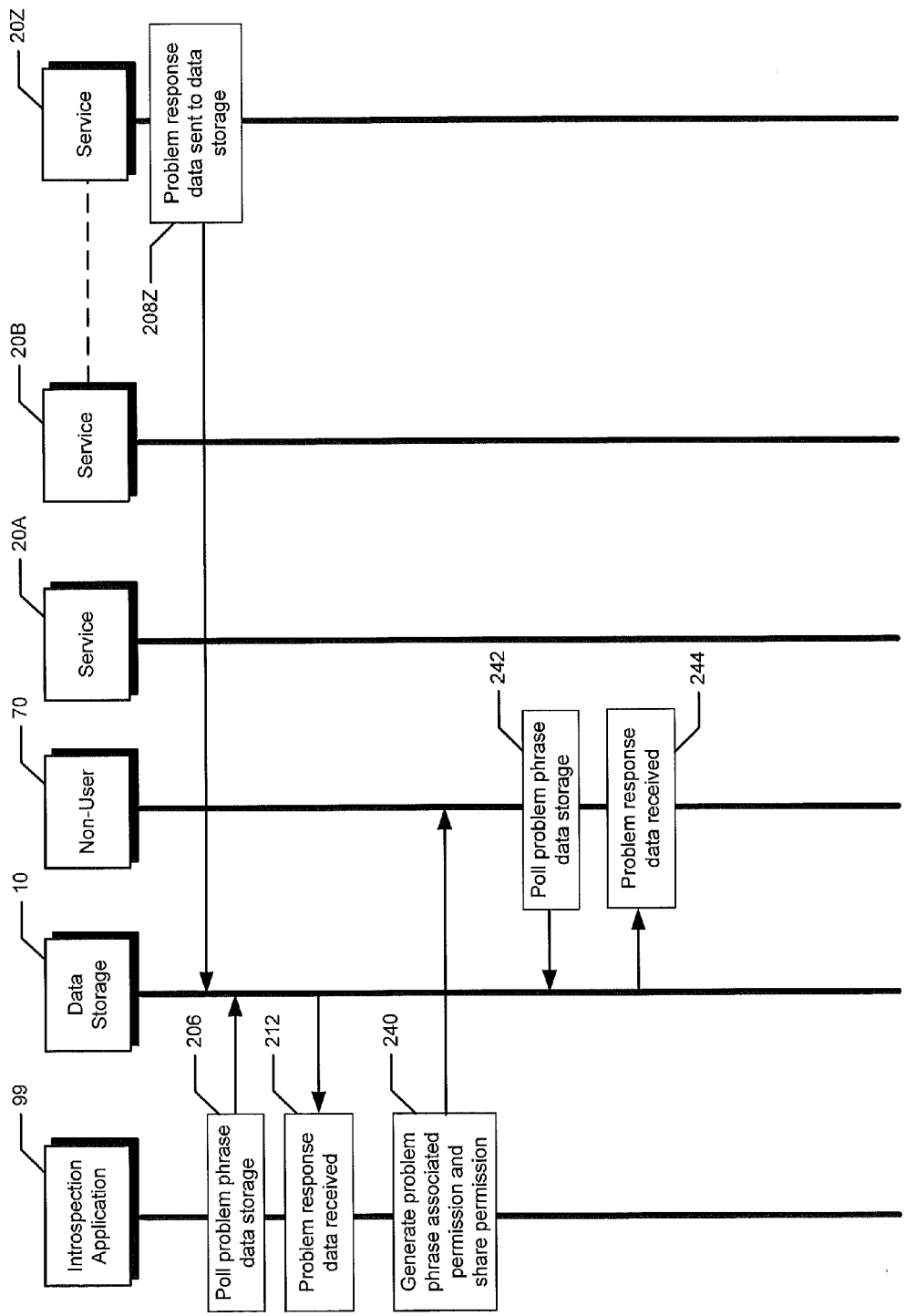
FIG. 5 is a diagram of operations and associated message flows that may be performed to identify functionality problems of an application in a distributed computing environment in which problem response data may be shared using a problem phrase associated permission according to some embodiments described herein.

Reference is now made to FIG. 5, which is a diagram of operations and associated message flows that may be performed by various elements disclosed herein to identify functionality problems of an application in a distributed computing environment in which problem response data may be shared using a problem phrase associated permission according to some embodiments described herein. The operations described herein begin after the problem request has been sent and the problem phrase data storage allocation has been generated, as described above regarding FIG. 2. Also as previously described, service 20Z sends problem response data to the data storage allocation (block 208Z), the introspection application 99 polls the data storage allocation (block 206) and receives problem response data (block 212).

Problem phrase associated permission may be generated and shared with a non-user 70 (block 240). In some embodiments, a common key of permission may be generated by hashing the problem phrase, and/or generating a large unique string that includes the problem phrase embedded therein, among others. A common key of permission may then be shared with others. Using the permission, the non-user 70 may poll the data storage allocation (block 242) and receive the problem response data therefrom (244). Allowing a non-user 70 to access the problem response data may be beneficial in several contexts. For example, the problem response data may be meaningful to a technical support individual who is helping the user to resolve problems.

Problem Response Data

Figure 6:
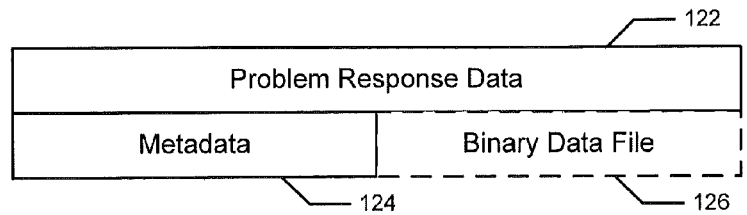
FIG. 6 is a block diagram illustrating a problem response data format used to identify functionality problems of an application in a distributed computing environment according to some embodiments described herein.

Reference is now made to FIG. 6, which is a block diagram illustrating a problem response data format that may be used to identify functionality problems of an application in a distributed computing environment according to some embodiments described herein. In some embodiments, the problem response data 122 may include metadata 124 and an optional binary data file 126. Some embodiments provide that the metadata 124 may include a link to a static document and/or an application that may be executed by actuating the metadata 124. For example, a static document may provide a general description of operations, functionalities, non-functionalities and/or other data corresponding to the service 20 that provided the metadata 124. Some embodiments provide that the metadata 124 may be specific to the type of problem being encountered. For example, different problem types may result in different metadata 124 provided by the same service, such that the different metadata 124 links to different documents.

In some embodiments, the metadata 124 may link the user to an application, such as, for example, a diagnostic application. The application may be configured to retrieve the binary data file 126 that is stored in the data storage allocation corresponding to the problem phrase. Some embodiments provide that different applications may be provided by the same service depending on the type of problem. In some embodiments, the same service may selectively determine to send metadata 124 that links to one or more documents, and/or one or more applications responsive to the type and/or nature of the problem. In this manner, each of the multiple services may selectively respond to a problem request, if at all.

System Embodiments

Figure 7:
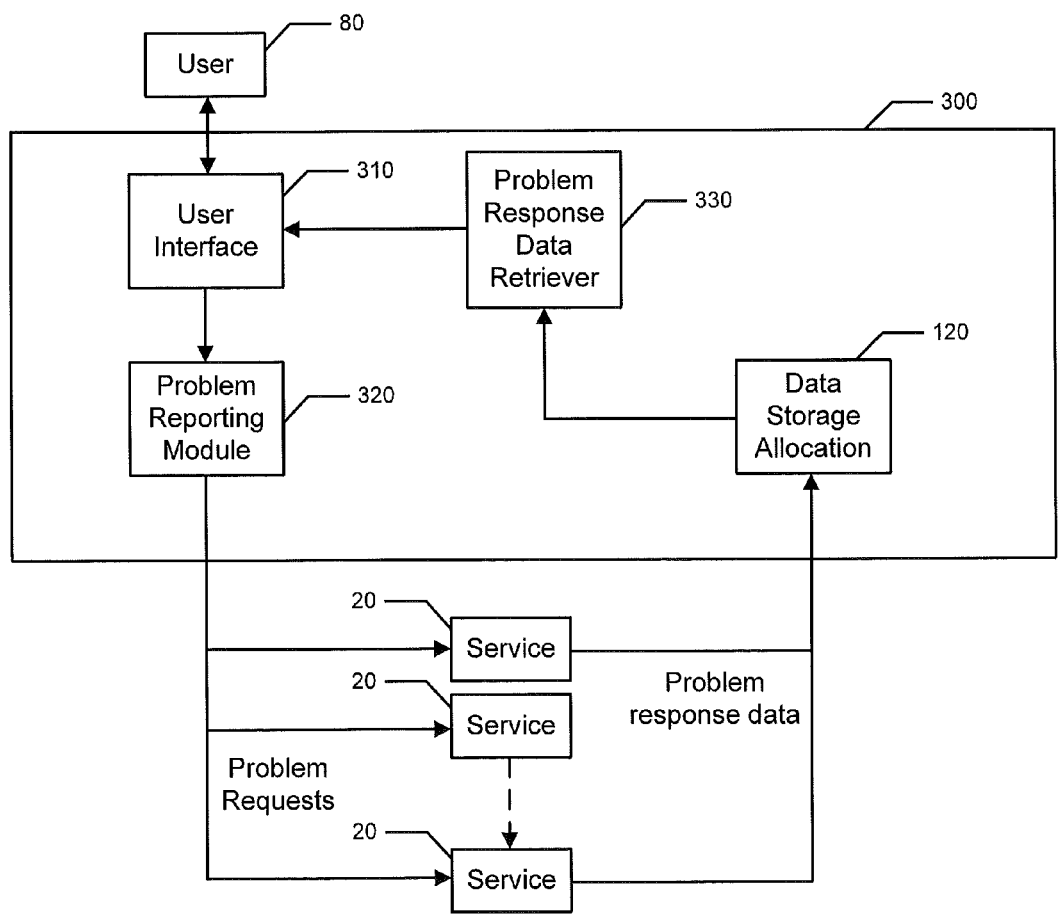
FIG. 7 is a block diagram of a system that may be used to identify functionality problems of an application in a distributed computing environment according to various embodiments described herein.

Reference is now made to FIG. 7, which is a block diagram of a system 300 that may be used to identify functionality problems of an application in a distributed computing environment according to various embodiments described herein. The system 300 may include a user interface 310 that is configured to be selectively displayed to a user 80. In some embodiments, the user interface 310 may include a pop-up window that is displayed over a window of the application being run in the distributed computing environment. Some embodiments provide that the user interface 310 is displayed in a new window that may open exclusively for the user interface 310. The user interface 310 may include a problem phrase entry field that is configured to receive a user-selected identifier. The user-selected identifier may provide a passphrase that provides a tracking token for the problem requests, the data storage and the problem response data. A graphical component may be provided that is configured to initiate a problem reporting function. The user interface 310 may include a problem response data field that is configured to display received problem response data. The user interface 310 may include other display control features such as buttons corresponding to minimize, maximize, expand, and/or collapse functions, among others.

The system 300 may include a problem reporting module 320 that is configured to send problem requests to the multiple services 20 that provide at least one function to the application. The problem requests may be sent responsive to the entry of the problem phrase and the user selecting a "GO" or other type input on the user interface 310. Some embodiments provide that the problem requests include content that is associated with the problem phrase and an identifier corresponding to the application. For example, in the context of a web browser application, the problem request may be the URL being resubmitted along with a query that includes the problem phrase.

A data storage allocation 120 that may be provided in the distributed computing environment is associated with the problem phrase. Some embodiments provide that the data storage allocation 120 may be provided through a cloud computing type data storage service, among others. The data storage allocation 120 may be allocated by a request from the problem reporting module 320 and/or one of the services 20. In either case, the data storage allocation 120 is associated with the problem phrase that was selected by the user. The data storage allocation 120 is configured to receive problem response data from one or more of the services 20 in response to the problem requests. As described above in reference to FIG. 6, the problem response data may include metadata only or metadata and binary data, the determination of which is made by each of the services 20. In this regard, the problem response data is optionally provided by each of the services 20 with a self-defined level of information.

A problem response data retriever 330 is configured to retrieve problem response data that has been stored in the data storage allocation 120. In some embodiments, the problem response data retriever 330 is configured to poll the data storage location 120 for problem response data and receive problem response data in response to the polling. The retrieved problem response data may be provided to the user interface 310 for display to the user 80. Some embodiments provide that the problem response data includes metadata that is configured to be accessible to the user in the problem response data field of the user interface 310. This metadata may be activated via the user interface to link to data provided by the services to access and/or determine the problem response data.

Miscellaneous Embodiments

Figure 8:
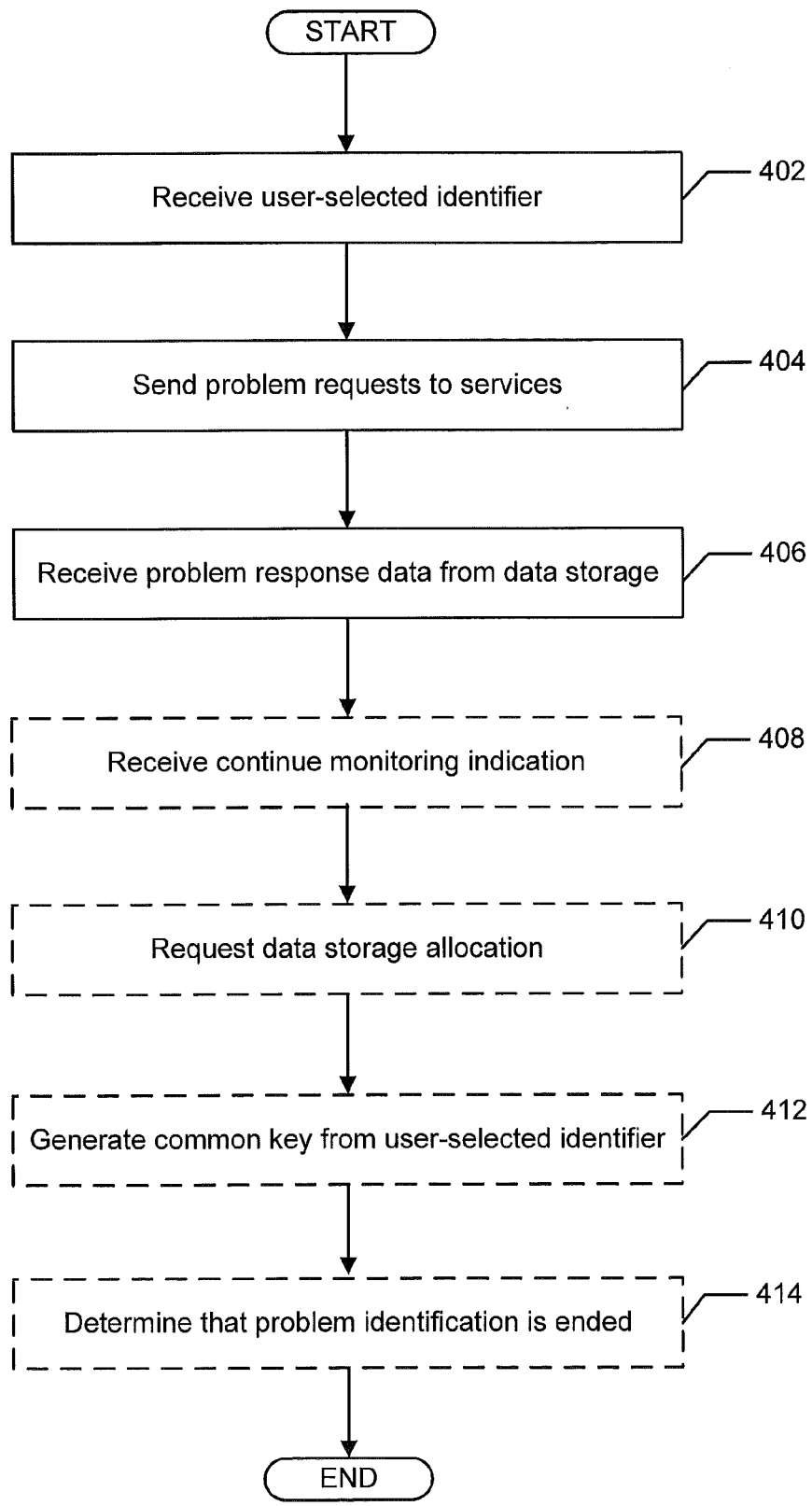
FIG. 8 is a flowchart of operations that may be performed to identify a functionality problem of an application in a distributed computing environment according to some embodiments described herein.

Reference is now made to FIG. 8, which is a flowchart of operations that may be performed to identify a functionality problem of an application in a distributed computing environment according to some embodiments described herein. Operations include receiving a user-selected identifier that corresponds to a nonfunctionality in an application that is being accessed by the user (block 402). For example, the user-selected identifier may include a character string or problem phrase that the user selects either as descriptive of the problem or application or as an arbitrary easy way to recall the problem phrase. Some embodiments provide that the user-selected identifier may be used in an ongoing manner and thus be associated with multiple different applications being accessed by the user.

Problem requests are sent to multiple services that contribute to the functionality of the application (block 404). In some embodiments, the problem requests include content corresponding to the user-selected identifier. Problem requests may be sent by resubmitting a request, such as a URL, along with a query including the problem phrase, for example.

Problem response data may be received from a data storage service that includes a data storage allocation associated with the user-selected identifier (block 406). The problem response data includes problem response data that was sent to the data storage allocation by one or more of the services. Some embodiments provide that the problem response data may be received from the data storage allocation responsive to polling the data storage allocation for the problem response data.

In some embodiments, the problem response data includes a resource specifier that specifies where a problem response resource is available. For example, the resource specifier may include metadata that provides a link to other information regarding the problem and/or the service. For example, some embodiments provide that the problem response data includes a service specific uniform resource locator (URL) that, when executed, directs the user to a document that includes service specific information.

In some embodiments, the problem response data may further include a binary data file that includes data associated with the nonfunctionality of the application. In this regard, a service specific URL may include a link to a service specific diagnostic application that accesses the binary data file and generates service specific information that corresponds to the application.

As described above, the user-selected identifier may be used in an ongoing manner and thus may be associated with multiple different applications being accessed by the user. In this regard, problem requests sent to the services may correspond to different session independent applications that use the same content corresponding to the user-selected identifier. As such, problem response data for the multiple different and session independent applications may be sent to the same data storage allocation that is associated with the problem phrase.

In addition to session independent problem requests, a continuous monitoring indication may be received from the user (block 408). In a continuous monitoring or logging mode, problem requests are sent to the services for the current application as well as each subsequent application accessed by the user. Accordingly, the problem requests sent to the services all include content corresponding to the problem phrase.

Some embodiments provide that the data storage allocation is generated responsive to a request to the data storage service (block 410). For example, some embodiments provide that one of the services requests the data storage allocation that is associated with the user-selected identifier. In some embodiments the request to generate the data storage allocation may be implicit in the polling of the data storage allocation. For example, if a non-existent data storage allocation is polled for problem response data, the data storage service may interpret that polling as a request to generate a data storage allocation that corresponds to the user-selected identifier.

Some embodiments provide that the data storage allocation is associated with a permission that corresponds to the user and is configured to provide access the data storage allocation. In some embodiments, a common key including encrypted content that corresponds to the permission may be generated (block 412). The common key may be transferrable to a second user. In this manner, the second user may be provided permission to access the data storage allocation.

In some embodiments, a determination may be made that the problem identification is ended (block 414). For example, although the services may be self-determinant regarding if, when and/or how they respond to a problem request, at some point the introspection application and/or one of the services may determine that the problem identification is complete. As such, metadata may be sent to the data storage allocation that generates a process complete and/or a process termination message and/or operation corresponding to the introspection application regarding that problem request. For example, some embodiments provide that the metadata generates an inquiry to the user regarding terminating the problem identification.

Figure 9:
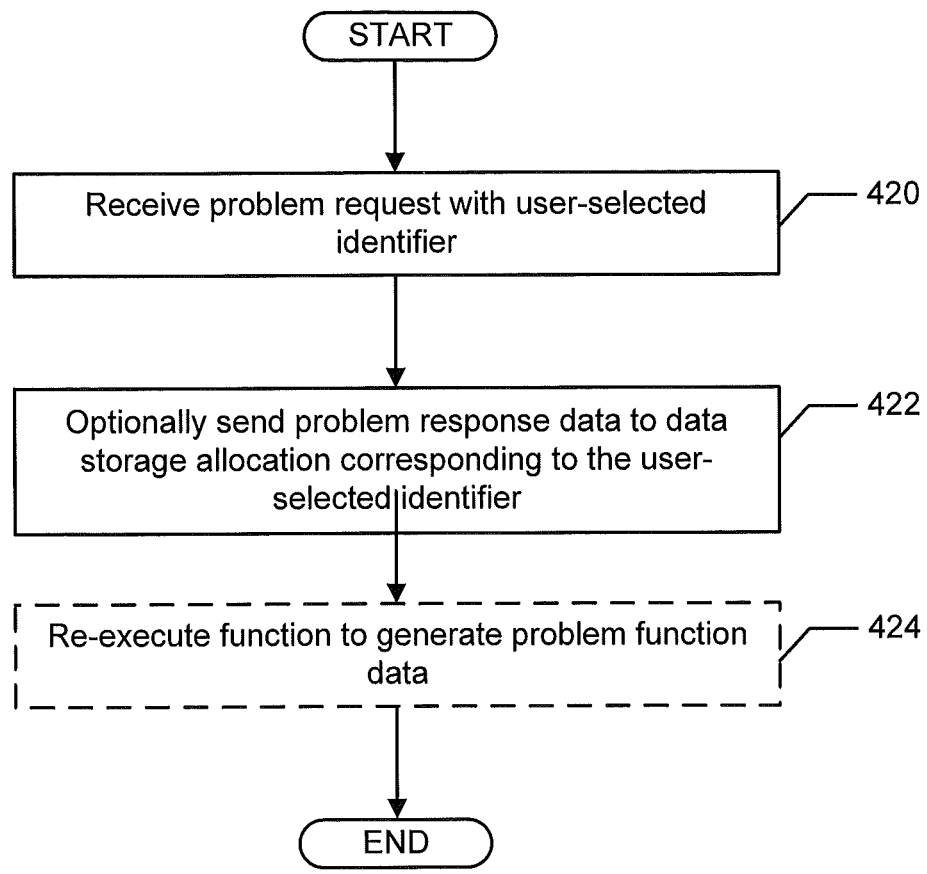
FIG. 9 is a flowchart of operations that may be performed to identify a functionality problem of an application in a distributed computing environment according to some embodiments described herein.

Reference is now made to FIG. 9, which is a flowchart of operations that may be performed to identify a functionality problem of an application in a distributed computing environment according to some embodiments described herein. Operations may include receiving, at multiple services that are used to perform a computing function requested by a user, a problem request that corresponds to a nonfunctionality in the computing function (block 420). The problem request may include a user-selected identifier and identification data corresponding to the computing function when the computing function was requested by the user. As described herein, the user-selected identifier may also be referred to as a problem phrase. Some embodiments provide that the problem phrase may be associated with multiple different computing functions. In some embodiments, the user is an online content developer of web-based applications and the computing function includes a web-based application in a development stage.

Some embodiments provide that after receiving the problem request, the services are configured to associate the computing function with the problem phrase and re-execute a request corresponding to the computing function to generate problem function data (block 424). In this manner, data corresponding to the problem may be determined by each of the services independently of other ones of the services.

Some embodiments include optionally sending, by the services that are used to perform the computing function, problem response data that corresponds to the computing function that is associated with the problem phrase to a data storage allocation that is identified by the problem phrase (block 422). In some embodiments, the problem response data that is sent to the data storage allocation may be a URL configured to link the user to a service specific resource that corresponds to the nonfunctionality. The URL may be configured to be retrieved from the data storage allocation by a user interface component. The URL may include a link to a document that provides service specific information to the user. For example, the service may provide an informational document corresponding to the functionality and/or nonfunctionality of that service.

In some embodiments, the URL includes a link to a service specific diagnostic application that may generate service specific information that corresponds to the computing function requested by the user. In this regard, the problem response data may include a binary data file that includes data that is associated with the computing function requested by the user. A binary data file may include data that is configured to be and/or formatted to be received, executed, analyzed and/or displayed by any number of different applications and in any number of different programming languages, as determined by the service. In some embodiments, the URL may link the user to a service specific resource that corresponds to the nonfunctionality and that may be configured to be retrieved from the data storage service by a user interface component. The URL may link to a service specific diagnostic application that may access the binary data file and generate service specific information that corresponds to the computing function requested by the user.

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

The invention claimed is:

1. A system for identifying problems in a distributed computing environment, the system comprising:
    a user interface configured to be selectively displayed to a user of the distributed computing environment corresponding to an application being accessed by the user, the user interface including a problem phrase entry field configured to receive a user-selected identifier, an initiation input configured to initiate a problem reporting function, and a problem response data field configured to display received problem response data, wherein the user-selected identifier includes a passphrase that provides a tracking token for a problem request;
    a problem reporting module that, responsive to initiating the problem reporting function, sends the problem request to a plurality of services that provide at least one function to the application, the problem request including content that is associated with the user-selected identifier and another identifier corresponding to the application;
    a data storage allocation in the distributed computing environment that is associated with the user-selected identifier, wherein the data storage allocation is allocated by a request from the problem reporting module or one of the plurality of services and that is configured to receive the problem response data from the one of the plurality of services in response to the problem request; and
    a problem response data retriever configured to retrieve the problem response data that has been stored in the data storage allocation.

2. The system according to claim 1, wherein the problem response data retriever is further configured to poll the data storage allocation for the problem response data and receive at least a portion of the problem response data responsive to polling the data storage allocation.

3. The system according to claim 1, wherein the problem response data is optionally provided by individual ones of the plurality of services, wherein the individual ones of the plurality of services are configured to optionally respond to the problem request with a self-defined level of information.

4. The system according to claim 1, wherein the problem response data includes metadata that is configured to be accessible to the user in the problem response data field.

5. The system of claim 1, wherein the problem response data includes a service specific uniform resource locator (URL) that directs the user to a document that includes service specific information.

6. A computer implemented method for identifying problems in a distributed computing system, the method comprising:
    receiving a user-selected identifier that corresponds to a nonfunctionality in an application in the distributed computing system that is being accessed by a first user;
    sending a plurality of problem requests to a plurality of services that are configured to contribute to a functionality of the application, wherein individual ones of the plurality of problem requests are marked with a tracking token corresponding to the user-selected identifier;
    receiving problem response data from a data storage service that includes a data storage allocation that is associated with the user-selected identifier and with a permission corresponding to the first user, the problem response data originating from at least one of the plurality of services and the permission being configured to provide access to the data storage allocation;
    generating a common key including encrypted content that corresponds to the permission;
    wherein the common key is transferable to a second user; and
    wherein the common key is configured to provide permission to the data storage allocation corresponding to the user-selected identifier.

7. The method according to claim 6, wherein the problem response data includes a resource specifier that specifies where a problem response resource is available, the resource specifier configured to be executed by the first user.

8. The method according to claim 6, wherein the problem response data includes a service specific uniform resource locator (URL) that corresponds to a document that includes service specific information.

9. The method according to claim 8, wherein the problem response data includes a binary data file that includes data associated with the nonfunctionality; and
wherein the service specific URL includes a link to a service specific diagnostic application configured to access the binary data file and generate the service specific information, wherein the service specific information corresponds to the application requested by the first user.

10. The method according to claim 6,
wherein the application comprises one application of a plurality of applications;
wherein the user-selected identifier corresponds to the plurality of applications in the distributed computing system that are being accessed by the first user;
wherein the plurality of problem requests are configured to contribute to the functionality of individual ones of the plurality of applications; and
wherein individual ones of the plurality of problem requests comprise content corresponding to the user-selected identifier.

11. The method according to claim 6, wherein receiving the problem response data from the data storage service comprises receiving an identity of the at least one of the plurality of services that provided the problem response data and an elapsed time from when the problem request was sent to when the problem response data was received.

12. The method according to claim 6, further comprising:
receiving a continue monitoring indication from the first user;
wherein the application comprises at least one of a plurality of applications; and
wherein the plurality of problem requests of the plurality of applications include content corresponding to the user-selected identifier.

13. The method according to claim 6, wherein receiving the problem response data from the data storage service comprises receiving the problem response data from the data storage service responsive to polling the data storage service for the problem response data.

14. The method according to claim 6, wherein the data storage allocation that is associated with the user-selected identifier is generated responsive to a request from at least one of the plurality of services.

15. The method according to claim 6, further comprising sending a request to the data storage service to generate the data storage allocation that is associated with the user-selected identifier.

16. The method according to claim 6, wherein the problem response data originated from at least one of the plurality of services;
wherein content of the problem response data is determined by the at least one of the plurality of services; and
wherein a response time for the problem response data is determined by the at least one of the plurality of services.

17. A computer program product for identifying problems in a distributed computing system, the computer program product comprising a non-transitory computer-readable medium having computer-readable program code executable by a computer, the computer-readable program code comprising:

code that receives a user-selected identifier that corresponds to a nonfunctionality in an application in the distributed computing system that is being accessed by a first user;
code that sends a plurality of problem requests to a plurality of services that are configured to contribute to a functionality of the application, wherein individual ones of the plurality of problem requests are marked with a tracking token corresponding to the user-selected identifier;
code that receives problem response data from a data storage service that includes a data storage allocation that is associated with the user-selected identifier and with a permission corresponding to the first user, the problem response data originating from at least one of the plurality of services and the permission being configured to provide access to the data storage allocation;
code that generates a common key including encrypted content that corresponds to the permission;
wherein the common key is transferrable to a second user; and
wherein the common key is configured to provide permission to the data storage allocation corresponding to the user-selected identifier.

18. A computer implemented method for identifying problems in a distributed computing system, the method comprising:
receiving, at a plurality of services that are used to perform a computing function requested by a user, a problem request that corresponds to a nonfunctionality in the computing function, wherein the problem request comprises a tracking token, a user-selected identifier, and identification data corresponding to the computing function; and
sending, by at least one of the plurality of services that are used to perform the computing function, problem response data that corresponds to the computing function that is associated with the user-selected identifier to a data storage service, wherein the problem response data includes a file name and a line number of a source code file and the data storage service generates a data storage allocation corresponding to the user-selected identifier.

19. The method according to claim 18,
wherein the problem response data that is sent to the data storage service includes a uniform resource locator (URL) configured to link the user to a service specific resource that corresponds to the nonfunctionality; and
wherein the URL is configured to be retrieved from the data storage service by a user interface component.

20. The method according to claim 19, wherein the URL includes a link to a document that provides service specific information to the user.

21. The method according to claim 19, wherein the URL includes a link to a service specific diagnostic application configured to generate service specific information that corresponds to the computing function requested by the user.

22. The method according to claim 18, wherein the problem response data includes a binary data file that includes data that is associated with the computing function requested by the user.

23. The method according to claim 22,
wherein the problem response data that is sent to the data storage service includes a uniform resource locator (URL) configured to link the user to a service specific resource that corresponds to the nonfunctionality;

wherein the URL is configured to be retrieved from the data storage service by a user interface component; and wherein the URL includes a link to a service specific diagnostic application configured to access the binary data file and generate service specific information that corresponds to the computing function requested by the user.

24. The method according to claim 18:

wherein the computing function comprises a plurality of computing functions;

wherein the user-selected identifier is used for individual ones of the plurality of computing functions; and wherein individual ones of the plurality of services optionally send the problem response data to the data storage allocation that corresponds to the user-selected identifier.

25. The method according to claim 18, wherein sending problem response data comprises:

determining whether to send the problem response data; and in response to determining whether to send the problem response data, determining what type of the problem response data to send and determining when to send the problem response data.

26. The method according to claim 18, wherein the computing function includes a web-based application.

27. The method according to claim 18, further comprising:

configuring the plurality of services to associate the computing function with the user-selected identifier in response to receiving the problem request; and reexecuting a request corresponding to the computing function to generate problem function data and to optionally send the problem response data to the data storage allocation.

28. A computer program product for identifying problems in a distributed computing system, the computer program product comprising a non-transitory computer-readable medium having computer-readable program code executable by a computer, the computer-readable program code comprising:

a first computer-readable program code that is configured to generate a network-based repository for receiving and storing problem identification data from participating ones of a plurality of services that respond to a problem request initiated by a user and corresponding to an application in the distributed computing system, wherein the problem request comprises a tracking token;

a second computer-readable program code that is configured to receive a user-generated problem phrase and to send the problem request to the plurality of services, the problem request including content corresponding to the user-generated problem phrase and identification data corresponding to the application in the distributed computing system when the user initiated the problem request; and a third computer-readable program code that is configured to poll the network-based repository for the problem identification data provided by at least one of the plurality of services and to display information fragments of the problem identification data to the user.

29. A computer program product according to claim 28, wherein the first computer-readable program code includes computer-readable program code that is configured to provide a single point of access between the network based repository and the third computer-readable program code that is configured to poll the network-based repository using an application programming interface.

30. A computer program product according to claim 29, wherein the problem identification data that is sent to the network-based repository includes a uniform resource locator (URL) configured to link the user to a service specific resource and a binary data file that includes data that is associated with the application.

31. A computer program product according to claim 30, wherein when the user executes the URL, a document that provides service specific information is displayed to the user.

32. A computer program product according to claim 30, wherein when the user executes the URL, a service specific diagnostic application configured to generate service specific information using the binary data file as an input file is executed and a result thereof is displayed to the user.

33. A computer program product according to claim 29, wherein the network based repository continues to receive the problem identification data from the participating ones of the plurality of services, and the computer-readable program code further comprising:

a fourth computer-readable program code that is configured to generate a reminder to the user that the network-based repository that corresponds to the user-generated problem phrase is currently active after a given time interval has elapsed.

* * * * *